United States Patent [19]
Longsdorf et al.

[11] Patent Number: 5,323,289
[45] Date of Patent: Jun. 21, 1994

[54] LIGHTNING PROTECTION FOR FIELD MOUNTED INSTRUMENTS

[75] Inventors: Randy J. Longsdorf, Chaska; Richard L. Nelson, Chanhassen, both of Minn.

[73] Assignee: Rosemount Inc., Eden Prairie, Minn.

[21] Appl. No.: 960,269

[22] Filed: Oct. 13, 1992

Related U.S. Application Data

[63] Continuation of Ser. No. 745,464, Aug. 14, 1991, abandoned.

[51] Int. Cl.$^5$ ............ H02H 9/06; H02H 3/22; H02H 1/04
[52] U.S. Cl. .................... 361/111; 361/117; 361/119
[58] Field of Search ............ 361/56, 111, 117, 119, 361/120

[56] References Cited

U.S. PATENT DOCUMENTS

| | | | |
|---|---|---|---|
| 4,497,033 | 1/1985 | Hernandez et al. | 364/551 |
| 4,758,920 | 7/1988 | McCartney | 361/119 |
| 4,901,183 | 2/1990 | Lee | 361/56 |
| 4,999,729 | 3/1991 | Stifter | 361/56 |

Primary Examiner—A. D. Pellinen
Assistant Examiner—Ronald W. Leja
Attorney, Agent, or Firm—Westman, Champlin & Kelly

[57] ABSTRACT

A protection circuit is provided for protecting sensitive electrical field instruments from a transient voltage strike and for ensuring that the instruments will meet safety approval during high potential voltage testing. The first and second wires of a two-wire circuit are connected to a first and second terminal respectively. A first surge arrestor electrically couples a first path between the first and second terminal. An impedance and a transient suppressor are connected in series and electrically couple a second path between the first and second terminal. The second path is coupled in parallel with the first path between the first and second terminal and is coupled closer to the internal components of the electrical instruments to be protected than is the first path. A second surge arrestor is electrically coupled between the second terminal and ground, and has a higher voltage breakdown potential than the first surge arrestor.

23 Claims, 5 Drawing Sheets

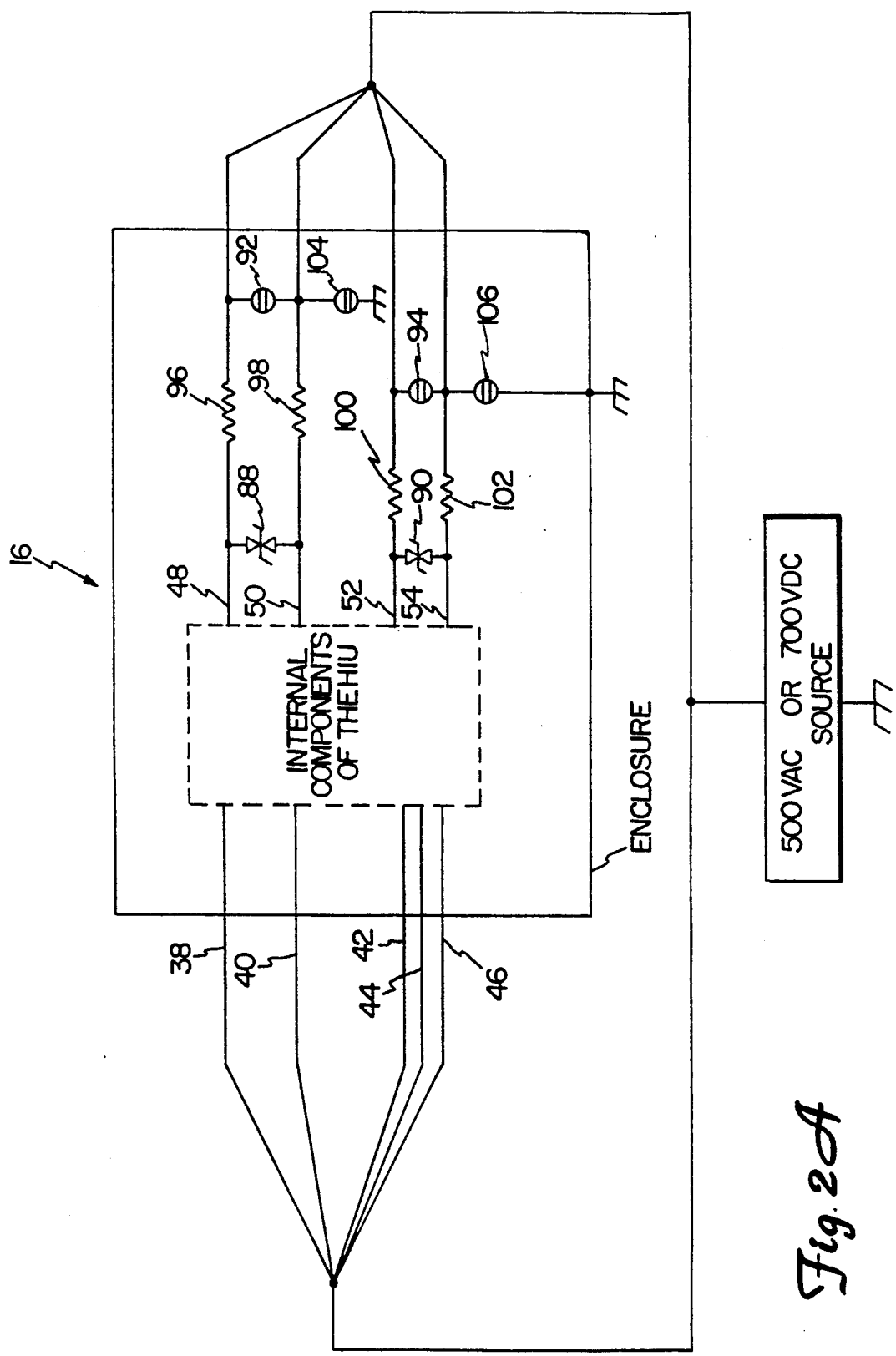

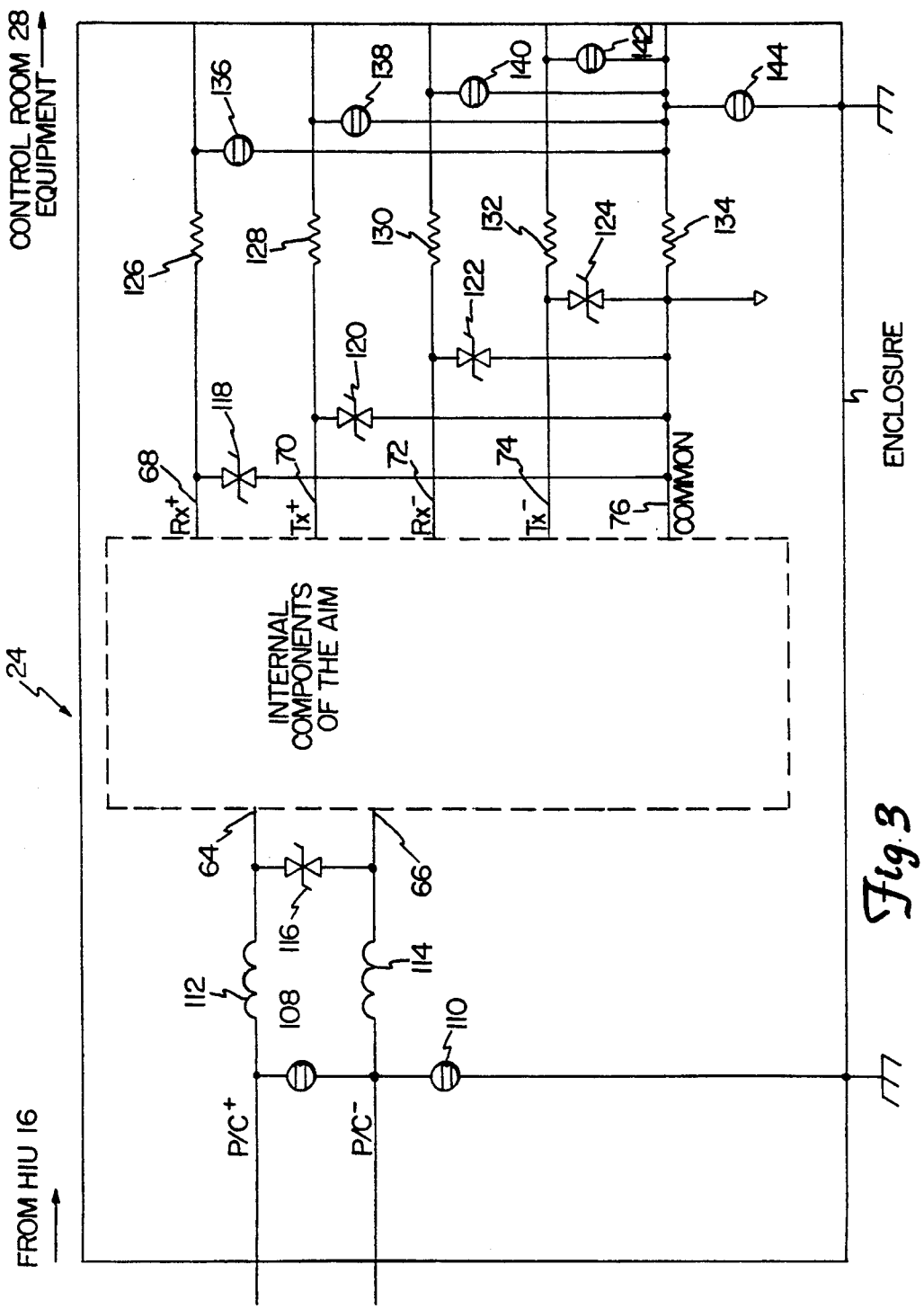

LIGHTNING PROTECTION FOR FIELD MOUNTED INSTRUMENTS

This is a continuation of application Ser. No. 07/745,464 filed on Aug. 14, 1991, abandoned as of the date of this application.

BACKGROUND OF THE INVENTION

This invention relates to an apparatus for protecting solid state electrical circuits in a grounded enclosure from transients induced on lines coming into the enclosure when there is a lightning strike, while also maintaining low leakage electrical isolation when a high test potential ("hi-pot test") is applied between the electrical circuits and the grounded enclosure.

Known protection circuits couple between each line and the grounded enclosure. Each protection circuit includes a gas filled surge arrestor coupled between two conductors (line to enclosure). A current limiting impedance, such as a resistor or inductor, in series with a solid state transient suppressor, such as a metal oxide varistor (MOV), are also coupled between the two conductors. This impedance limits current to the transient suppressor and allows sufficient voltage to build up to fire the surge arrestor.

The surge arrestor shunts large currents (many thousands of amps); however, it is slow to fire or turn on. The transient suppressor responds more rapidly; however, it can shunt only lower levels of current.

When there is an induced transient, the transient suppressor will conduct before the gas filled surge arrestor and limit the potential applied to the protected circuit to a level compatible with the maximum rating of the protected circuit. The potential drop across the impedance allows enough potential across the surge arrestor to fire it, which then shunts larger currents.

To avoid undesired circulation of ground currents in circuit conductors and avoid coupling energized circuit conductors to the enclosure, electrical isolation is desired between the circuitry and the enclosure. This isolation is tested by connecting all circuit lines together and imposing a high potential, typically 500 VAC or 700 VDC, between the lines and the enclosure which is normally grounded. Leakage current is measured with the high potential applied and is required to be at a low level, typically 5 milliamperes (mA) or less.

When the hi-pot voltage test is applied to a field mounted instrument having circuitry which includes protective components, these protective components will conduct and shunt current to the enclosure. Therefore, the leakage will exceed the 5 mA leakage current specification. In the past, hi-pot tests were done on instruments with the lightning protection circuits disconnected, and then the lightning protection circuits were reconnected before placing the instrument in service. New test methods require that the lightning protection circuits remain connected while the hi-pot test is performed. The existing lightning protection circuits, however, produce too much leakage through the transient suppressor, and the instrument does not meet the leakage standard.

Thus, there is a need for protection circuitry which will not only better protect the field mounted instruments from an induced transient, but will also ensure that the field mounted instruments will meet leakage limits during high potential voltage testing.

SUMMARY OF THE INVENTION

The protection circuitry of the present invention protects a pair of terminals of a field instrument from lightning and other electrical transients. The protection circuitry includes first and second surge arrestors, a first transient suppressor, and impedance means.

The first surge arrestor is connected between the first and second terminals, and the second surge arrestor is connected between the second terminal and a grounded enclosure. The first transient suppressor and the impedance means are connected in between the first and second terminals.

The second surge arrestor preferably has a higher breakdown voltage than the first surge arrestor, and provides the ability of the protection circuitry to pass hi-pot isolation testing.

In embodiments in which there are more than two terminals to be protected, the additional terminals are protected by additional surge arrestors, transient suppressors, and impedance means.

BRIEF DESCRIPTION OF THE DRAWINGS

FIG. 2A is a schematic diagram, similar to FIG. 2, in which communication lines are shorted together for safety approval testing.

FIG. 3 is a schematic diagram of the improved lightning protection circuitry for an application interface module in accordance with the present invention.

DETAILED DESCRIPTION OF THE PREFERRED EMBODIMENTS

Figure 1:
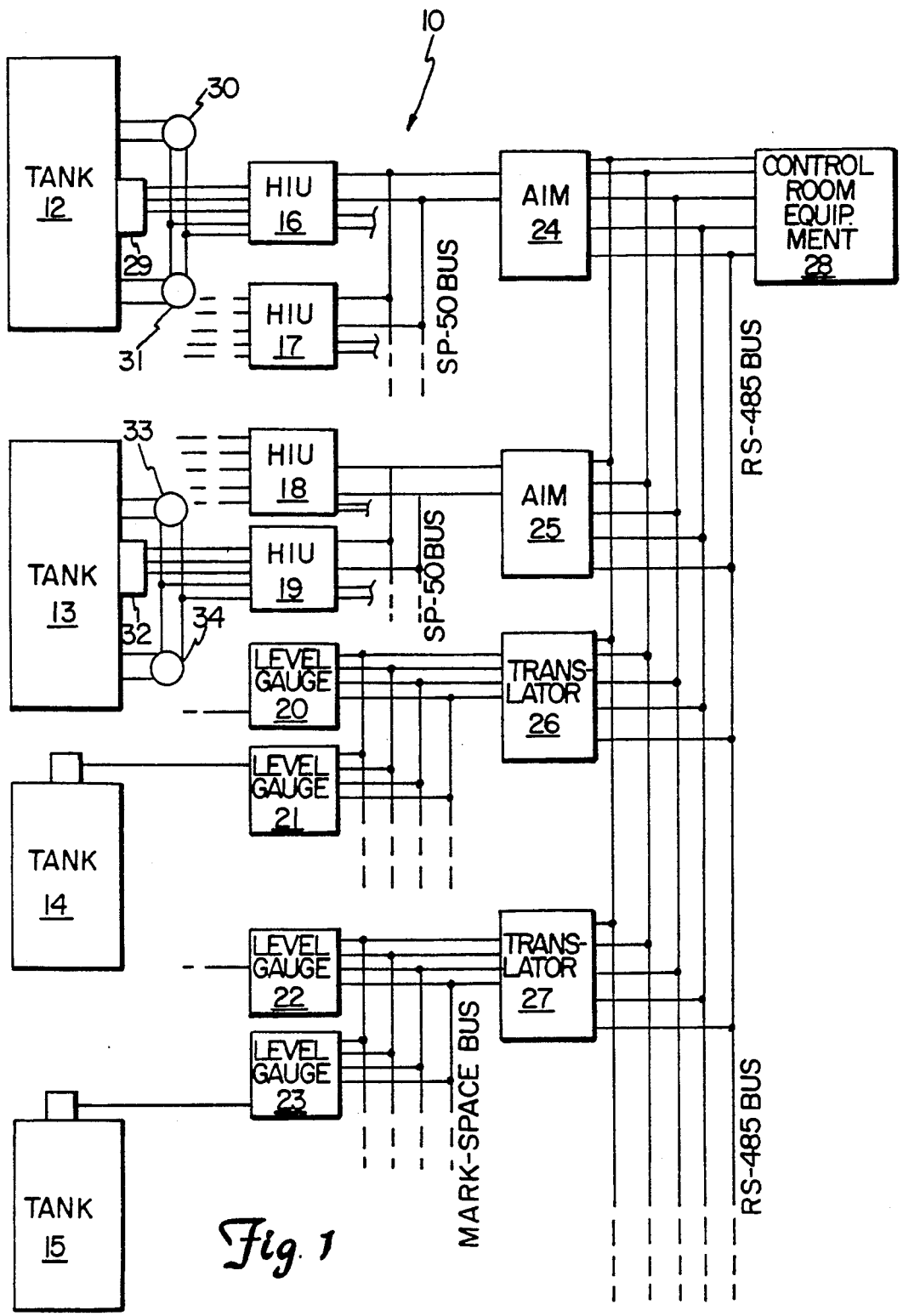
FIG. 1 is a block diagram of a tank gauging system which uses field mounted instruments having the protection circuitry of the present invention.

FIG. 1 shows one preferred embodiment of a tank gauging system 10. In FIG. 1, a relatively small tank gauging system is depicted with dashed lines indicating additional connections for systems including more tanks and more associated equipment than are shown in FIG. 1. Tank gauging system 10 includes tanks 12, 13, 14, and 15, hydrostatic interface units (HIUs) 16, 17, 18, and 19, level gauges 20, 21, 22, and 23, application interface modules (AIMs) 24 and 25, translators 26 and 27 and control room equipment 28. In this preferred embodiment, tank 12 is fitted with three sensors: RTD temperature sensor 29, middle level pressure transmitter 30, and bottom level pressure transmitter 31. Likewise, tank 13 is fitted with three sensors: RTD temperature sensor 32, middle pressure transmitter 33, and bottom pressure transmitter 34. HIUs 16, 17, 18, and 19 are each connected to the sensors on a tank for receiving the sensor outputs as shown in FIG. 1.

HIUs 16, 17, 18, and 19 transmit tank level information and other parameters over long cables to AIMs 24 and 25 using serial communication such as the SP-50 (draft standard) bus communication. AIMs 24 and 25 receive tank level information from HIUs 16, 17, 18, and 19 and retransmit the information to control equipment 28 via an RS-485 bus as shown in FIG. 1.

Level gauges 20, 21, 22, and 23 sense tank levels in tanks such as tanks 14 and 15 and transmit level information over mark-space busses to translators 26 and 27 as shown in FIG. 1. Translators 26 and 27 translate the level information to an RS-485 format and transmit the information over the RS-485 bus to control room equipment 28.

In addition to carrying information, busses can also carry energization current for the various pieces of equipment.

Figure 2:
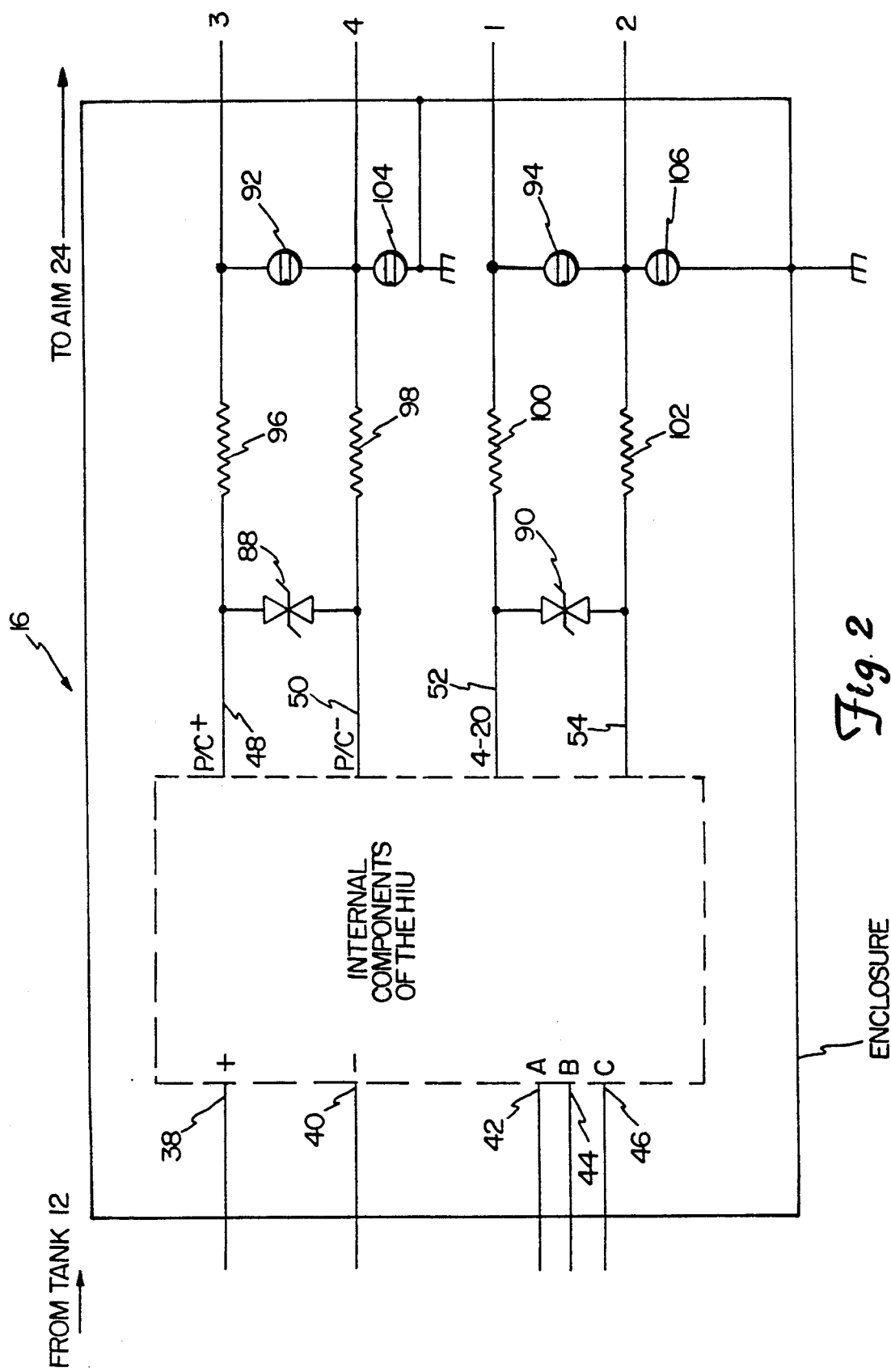
FIG. 2 is a schematic diagram of the improved lightning protection circuitry for a hydrostatic interface unit in accordance with the present invention.

FIG. 2 is a detailed drawing of the lightning protection system for protecting HIU 16 from a lightning induced transient which may occur between HIU 16 and AIM 24. Transient suppressor 88 electrically couples between positive power/communication line 48 and negative power/communication line 50; and transient suppressor 90 couples between four-twenty (4-20) milliamp lines 52 and 54. Gas-filled surge arrestors 92 and 94 also electrically couple between positive power/communication line 48 and negative power/communication line 50, and four-twenty (4-20) milliamp lines 52 and 54, respectively as shown in FIG. 2. Impedances 96, 98, 100, and 102 limit the current flow in positive power/communication line 48, negative power/communication line 50, and four-twenty (4-20) milliamp lines 52 and 54, respectively. Gas-filled surge arrestor 104 electrically couples negative power/communication line 50 to the enclosure which is connected to earth ground, while gas-filled surge arrestor 106 electrically couples line 54 to the grounded enclosure.

In operation, the lightning protection circuitry shown in FIG. 2 will protect the internal circuitry of HIU 16 from a lightning induced transient between HIU 16 and AIM 24, while not presenting any leakage paths through solid state components to the grounded enclosure during a high potential voltage test.

The protection circuitry electrically coupling four-twenty (4-20) milliamp line 52 to line 54 is substantially similar to the circuitry electrically coupling positive power/communication line 48 to negative power/communication line 50. Therefore, only the circuitry protecting positive power/communication line 48 and negative power/communication line 50 will be discussed.

When there is a lightning strike inducing a transient, transient suppressor 88, which can be a metal oxide varistor (MOV) or Zener diodes, conducts and limits the voltage between positive power/communication line 48 and negative power/communication line 50 to a level below the maximum rating of the internal components of HIU 16. This clamp voltage of the transient suppressor 88 is chosen so that it is small enough to prevent damage to any internal circuitry located inside HIU 16. Generally, this value is between 5 volts and 90 volts, depending on the internal circuitry to be protected.

Large amounts of current are shunted to negative power/communication line 50, allowing enough voltage across impedances 96 and 98 to fire surge arrestor 92, which then shunts even larger currents to negative power/communication line 50. At this point, if there is enough voltage across gas-filled surge arrestor 104, it will fire and shunt current to the enclosure which is grounded. Therefore, the internal components of HIU 16 will be left undamaged from the induced transient.

Lines 38, 40, 42, 44, and 46 shown in FIG. 2 can also be protected with similar circuitry, if desired.

During a high potential voltage test, all of the input and output lines of HIU 16 are shorted together, as shown in FIG. 2A. At this point, 500 VAC or 700 VDC is connected between the terminals and the grounded enclosure. Therefore, gas-filled surge arrestor 104 must have a firing voltage rating greater than the hi-pot test voltage applied between the terminals to ensure a low level of leakage. At a minimum, this voltage rating must exceed 500 VAC or 700 VDC depending on the test potential applied.

The transient protection circuitry connected between the four-twenty (4-20) milliamp lines 52 and 54 is similar to the circuitry just described between positive power/communication line 48 and negative power/communication line 50.

FIG. 3 is a detailed diagram of lightning protection circuitry which protects the internal circuitry of AIM 24 from an induced transient on lines 64 and 66 between AIM 24 and HIU 16, as well on lines 68, 70, 72, 74 and 76 between AIM 24 and control room equipment 28. The protection circuitry in AIM 24 includes gas filled surge arrestors 108, 136, 138, 140, and 142 connected between lines 64, 66, 68, 70, 72, 74, and 76. Resistors 126, 128, 130, 132, 134 are coupled between lines 68, 70, 72, 74, and 76, respectively, and internal components to provide current limiting for transient suppressors 118, 120, 122, and 124. Lines 64 and 66, which carry DC current during normal operation, are protected with current limiting inductors 112 and 114. The current limiting inductors provide a smaller DC voltage drop than would current limiting resistors.

In FIG. 3, surge arrestors 110 and 144 couple between lines 66 and 76, respectively, and the enclosure to shunt current to the grounded enclosure.

At the onset of a lightning strike, or other such transient, transient suppressor 116 conducts and limits the voltage between positive power/communication line 64 and negative power/communication line 66 to the component rating for maximum clamping voltage. This component rating is chosen so that it is small enough to prevent damage to any internal circuitry located inside AIM 24. Generally, this value is between 5 volts and 90 volts, depending on the internal circuitry to be protected.

Large amounts of current are shunted to negative power/communication line 66, allowing enough voltage across impedances 112 and 114 to fire surge arrestor 108, which then shunts energy to negative power communication line 66. At this time, if there is enough voltage across gas-filled surge arrestor 110, it fires and shunts energy to earth ground.

Figure 3A:
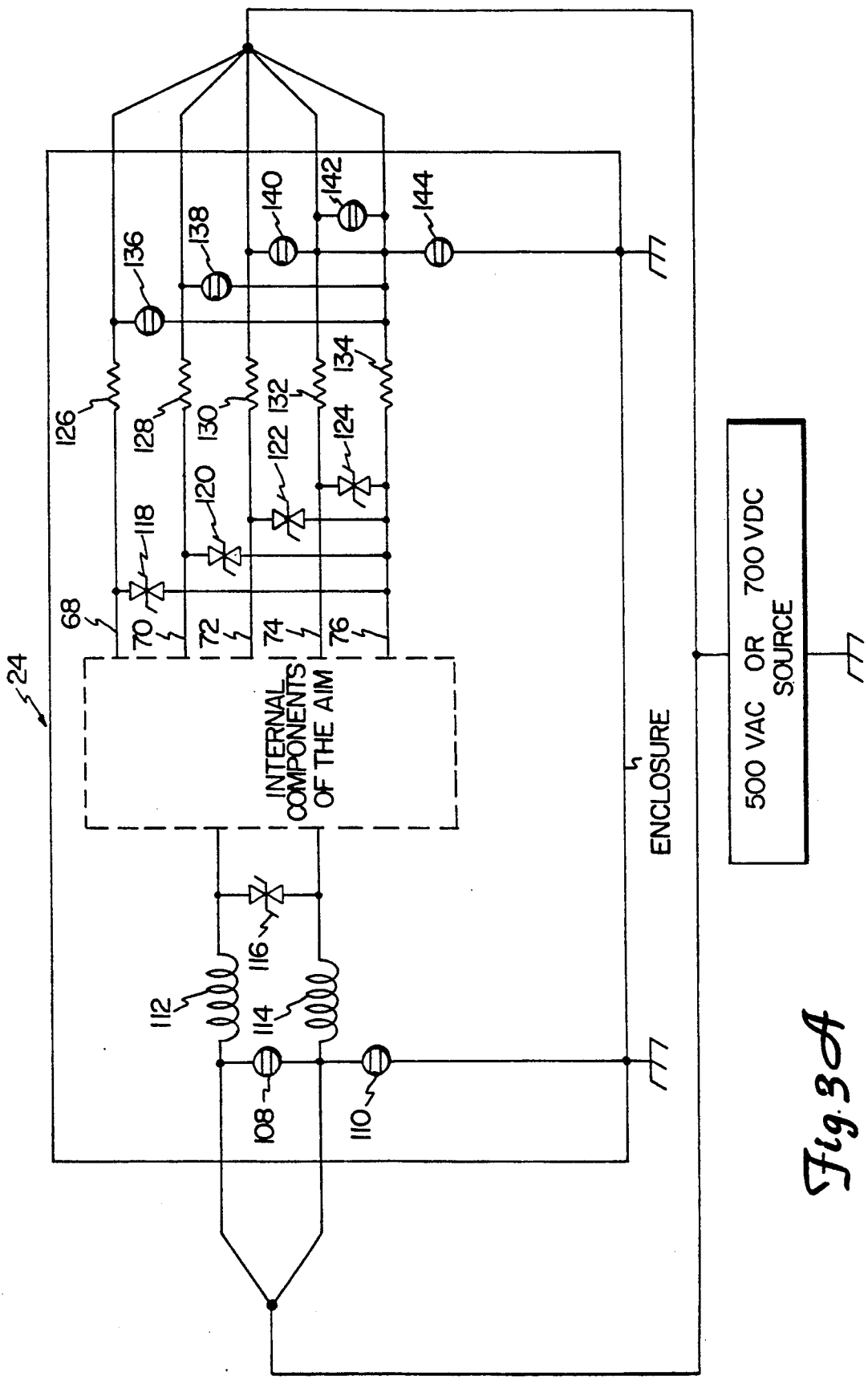
FIG. 3A is a schematic diagram, similar to FIG. 3, in which communication lines are shorted together for safety approval testing.

During a high potential voltage test, all of the input and output lines of AIM 24 are shorted together, as shown in FIG. 3A. At this point, 500 VAC or 700 VDC is connected between the terminals and ground. Therefore, gas-filled surge arrestors 144 and 110 must have a voltage rating greater than the voltage applied between the terminals to ensure low leakage. At a minimum, this voltage rating must exceed 500 VAC or 700 VDC.

The lightning protection circuitry described herein protects sensitive electrical equipment located inside HIU 16 or AIM 24. Similar circuits can also be used in translator 26, for example. The transient suppressors conduct and limit the voltage between the protected lines to the component rating for maximum clamping voltage. This component rating should be calculated so that the level is well within the withstand capability of the components used in the product circuitry. However, since the transient suppressor has a limited ability to withstand high current surges, a surge arrestor which has the ability to shunt large amounts of current must be placed in parallel with the transient suppressor. The surge arrestor connected to earth ground must have a large maximum voltage capacity for the circuitry to ensure low leakage of current. During a high potential voltage test, all input and output terminals are connected together and 500 VAC or 700 VDC is applied between the terminals and ground.

Although the present invention has been described with reference to preferred embodiments, workers skilled in the art will recognize that changes may be made in form and detail without departing from the spirit and scope of the invention.

What is claimed is:

1. In a field instrument having circuitry electrically isolated from ground and having a plurality of terminals including first and second terminals for connection to an external device, a protection circuit for protecting the circuitry from a transient strike, the protection circuit comprising:

a first surge arrestor connected between the first and second terminals for shunting large amounts of current to the second terminal;

a single current path located between the plurality of terminals and ground, the single current path including a second surge arrestor connected between the second terminal and ground;

a first impedance means connected between the first terminal and a first internal node;

a second impedance means connected between the second terminal and a second internal node;

a first transient suppressor connected between the first and second internal nodes for maintaining a threshold voltage differential between the first and second internal nodes; and wherein the second surge arrestor has a firing voltage which exceeds 500 VAC and 700 VDC and the second surge arrestor exhibits a leakage current of less than 5 milliamps at voltages less than the firing voltage so that the leakage current to ground for the field instrument is less than approximately 5 milliamps when a voltage of 500 volts AC is applied between the plurality of input terminals and ground and so that the leakage current to ground is less than approximately 5 milliamps when a voltage of 700 volts DC is applied between the plurality of input terminals and ground to preserve electrical isolation between the field instrument and ground.

2. The field instrument of claim 1 further including a third terminal and a third internal node, and the protection circuit further comprising:

a third surge arrestor connected between the third terminal and the second terminal for shunting large amounts of current to the second terminal;

a third impedance means connected between the third terminal and the third internal node; and a second transient suppressor connected between the second and third internal nodes for maintaining a threshold voltage differential between the second and third internal nodes.

3. The field instrument of claim 2, further including a fourth terminal and a fourth internal node, and the protection circuit further comprising:

a fourth surge arrestor connected between the fourth terminal and the second terminal for shunting large amounts of current to the second terminal;

a fourth impedance means connected between the fourth terminal and the fourth internal node; and a third transient suppressor connected between the second and fourth internal nodes for maintaining a threshold voltage differential between the second and fourth internal nodes.

4. The field instrument of claim 3 further including a fifth terminal and a fifth internal node, and the protection circuit further comprising:

a fifth surge arrestor connected between the fifth terminal and the second terminal for shunting large amounts of current to the second terminal;

a fifth impedance means connected between the fifth terminal and the fifth internal node; and a fourth transient suppressor connected between the second and fifth internal nodes for maintaining a threshold voltage differential between the second and fifth internal nodes.

5. The fifth instrument of claim 1 wherein the first impedance means of the protection circuit includes a resistor.

6. The field instrument of claim 1 wherein the first impedance means of the protection circuit includes an inductor.

7. The field instrument of claim 1 wherein the second surge arrestor of the protection circuit has a higher breakdown voltage than the first surge arrestor.

8. The field instrument of claim 1 wherein the first and second surge arrestors of the protection circuit are gas filled tubes.

9. The field instrument of claim 1 wherein the first transient suppressor of the protection circuit includes a solid state device.

10. The field instrument of claim 1 further including third and fourth terminals and third and fourth internal nodes, the protection circuit further comprising:

a third surge arrestor connected between the third and fourth terminals for shunting large amounts of current to the fourth terminal;

a fourth surge arrestor connected between the fourth terminal and ground;

a third impedance means connected between the third terminal and the third internal node;

a fourth impedance means connected between the fourth terminal and the fourth internal node; and a second transient suppressor connected between the third and fourth internal nodes for maintaining a threshold voltage differential between the third and fourth internal nodes.

11. In a field instrument having first and second terminals for connection to an external device, a protection circuit comprising:

a first surge arrestor connected between the first and second terminals for shunting large amounts of current to the second terminal;

a first transient suppressor connected between the first and second terminals for maintaining a threshold voltage differential between the first and second terminals;

a first impedance connected to the first terminal between the first transient suppressor and the first surge arrestor;

a second impedance connected to the second terminal between the first transient suppressor and the first surge arrestor; and ground connection means for connecting the second terminal to earth ground, the ground connection means including a single current path to ground, the single current path including a surge arrestor, wherein the ground connection means is configured so that leakage current to earth ground is less than approximately 5 milliamps when a voltage of 500 volts AC is applied between the first terminal and earth ground, and between the second terminal and earth ground, and so that the leakage current to earth ground is less than approximately 5 milliamps when a voltage of 700 volts DC is applied between the first terminal and earth ground, and between the second terminal and earth ground.

12. The field instrument of claim 11 wherein the surge arrestor of the ground connection means in the protection circuit includes a gas-filled surge arrestor.

13. The field instrument of claim 11 wherein the ground connection means in the protection circuit provides connection to earth ground through use of a non-solid state device between the protection circuit and earth ground.

14. The field instrument of claim 11 wherein the surge arrestor of the ground connection means in the protection circuit comprises:
 a gas-filled surge arrestor having a breakdown voltage of at least approximately 500 volts AC.

15. The field instrument of claim 11 wherein the surge arrestor of the ground connection means in the protection circuit comprises:
 a gas-filled surge arrestor having a breakdown voltage of at least approximately 700 volts DC.

16. In a field instrument having a plurality of terminals including first and second terminals for connection to an external device, a protection circuit for protection circuitry within the field instrument from a transient strike, the protection circuit comprising:
 a first impedance means connected between the first terminal and a first internal node;
 a second impedance means connected between the second terminal and a second internal node;
 first clamping means connected between the first and second internal nodes for clamping a first voltage at the first internal node substantially equal to a second voltage at the second internal node;
 a first surge arrestor connected between the first and second terminals for shunting large amounts of current to the second terminal;
 the protection circuit consisting of a single current path to ground associated with the first and second terminals and being located between one of the first and second terminals and ground, the single current path consisting of a second surge arrestor; and
 wherein the first internal node is electrically isolated from ground and the second internal node is electrically isolated from ground.

17. The field instrument of claim 16 wherein the first clamping means of the protection circuit is a first transient suppressor which maintains a substantially constant voltage between the first and second internal nodes during the transient strike.

18. The field instrument of claim 17 further including a third terminal and a third internal node, and wherein the protection circuit further comprises:
 a third surge arrestor connected between the second and third terminals for shunting large amounts of current to the second terminal;
 a third impedance means connected between the third terminal and the third internal node; and
 a second clamping means connected between the second and third internal nodes for clamping a third voltage at the third internal node substantially equal to the second voltage at the second internal node.

19. The field instrument of claim 18 where the second clamping means of the protection circuit is a second transient suppressor which maintains a substantially constant voltage between the second and third internal nodes during the transient strike.

20. The field instrument of claim 19 further including a fourth terminal and a fourth internal node, and wherein the protection circuit further comprises;
 a fourth surge arrestor connected between the fourth terminal and second terminals for shunting large amounts of current to the second terminal;
 a fourth impedance means connected between the fourth terminal and the fourth internal node; and
 a third clamping means connected between the fourth and second internal nodes for clamping a fourth voltage at the fourth internal node substantially equal to the second voltage at the second internal node.

21. The field instrument of claim 20 wherein the third clamping means of the protection circuit is a third transient suppressor which maintains a substantially constant voltage between the second and fourth internal nodes during the transient strike.

22. The field instrument of claim 21 further including a fifth terminal and a fifth internal node, and wherein the protection circuit further comprises:
 a fifth surge arrestor connector between the fifth and second terminals for shunting large amounts of current to the second terminal;
 a fifth impedance means connected between the fifth terminal and the fifth internal node; and
 a fourth clamping means connected between the fourth and second internal node for clamping a fifth voltage at the fifth internal node substantially equal to the second voltage at the second internal node.

23. The field instrument of claim 22 wherein the fourth clamping means of the protection circuit is a fourth transient suppressor which maintains a substantially constant voltage between the second and fifth internal nodes during the transient strike.

* * * * *

UNITED STATES PATENT AND TRADEMARK OFFICE
CERTIFICATE OF CORRECTION

PATENT NO. : 5,323,289
DATED : June 21, 1994
INVENTOR(S) : Randy J. Longsdorf et al.

It is certified that error appears in the above-indentified patent and that said Letters Patent is hereby corrected as shown below:

Column 2, line 12, the word "in" should be deleted.

Column 6, line 15, cancel "fifth" and insert --field--.

Column 7, line 29, "protection" (2nd occurrence) should read --protecting--.

Signed and Sealed this

Eighth Day of November, 1994

Attest:

BRUCE LEHMAN

Attesting Officer

Commissioner of Patents and Trademarks